United States Patent [19]

Hutchison

[11] Patent Number: 4,583,903
[45] Date of Patent: Apr. 22, 1986

[54] APPARATUS FOR BOTTOM UNLOADING OF STORAGE STRUCTURES

[75] Inventor: Marion E. Hutchison, Waterloo, Iowa

[73] Assignee: Tiger Industries, Inc., Waterloo, Iowa

[21] Appl. No.: 567,898

[22] Filed: Jan. 3, 1984

[51] Int. Cl.$^4$ .............................................. B65G 65/46
[52] U.S. Cl. ................................. 414/311; 198/676; 414/306
[58] Field of Search ............... 414/306, 310, 311, 326; 198/674, 675, 676, 677; 74/801

[56] References Cited

U.S. PATENT DOCUMENTS

| | | | |
|---|---|---|---|
| Re. 25,863 | 9/1965 | Laidig | 414/311 |
| 1,275,558 | 8/1918 | Holmgreen | 414/310 |
| 2,250,670 | 7/1941 | Joy | 74/801 |
| 2,497,659 | 2/1950 | Davis et al. | 74/801 |
| 2,635,770 | 4/1953 | Tiedemann | 414/307 |
| 2,675,931 | 4/1954 | Makous | 414/307 |
| 2,711,814 | 6/1955 | McCarthy | 198/616 |
| 2,736,461 | 2/1956 | Dueringer et al. | 414/306 X |
| 2,755,942 | 7/1956 | Broberg | 198/861 X |
| 2,901,131 | 8/1959 | Collier | 414/306 |
| 2,914,198 | 11/1959 | Hein | 414/310 |
| 2,934,224 | 4/1960 | Puckett | 414/310 |
| 2,969,156 | 1/1961 | Miller et al. | 414/312 |
| 3,024,923 | 3/1962 | Osborne | 414/308 |
| 3,084,814 | 4/1963 | Schaefer | 414/310 |
| 3,237,788 | 3/1966 | Weaver et al. | 414/307 |
| 3,282,446 | 11/1966 | Laidig | 414/311 |
| 3,289,862 | 12/1966 | Weaver et al. | 414/312 |
| 3,298,543 | 1/1967 | Laidig | 414/307 |
| 3,367,519 | 2/1968 | Ferris et al. | 414/310 |
| 3,519,152 | 7/1970 | Broberg | 198/865 X |
| 3,532,232 | 10/1970 | Sukup | 414/310 X |
| 3,817,409 | 6/1974 | Weaver | 414/311 X |
| 3,851,774 | 12/1974 | Laidig et al. | 414/310 X |
| 3,908,839 | 9/1975 | Menaut | 414/306 X |
| 4,076,133 | 2/1978 | Weaver | 414/311 |
| 4,377,364 | 3/1983 | Weaver | 414/306 X |
| 4,386,695 | 6/1983 | Olson | 414/310 X |
| 4,432,687 | 2/1984 | Weaver | 414/307 |

Primary Examiner—Robert J. Spar
Assistant Examiner—Stuart J. Millman
Attorney, Agent, or Firm—Dean P. Edmundson

[57] ABSTRACT

Apparatus is described for bottom unloading of storage structures (e.g., farm silos and the like). The apparatus includes a pivotable sweep arm which may include either a rotatable auger or an endless chain. Unique ratchet advancement mechanism at the inner end of the sweep arm pivots the sweep arm. A planetary gear mechanism is adapted to transmit rotational energy provided by the power source to the sweep arm. An improved tooth is described for penetrating and dislodging bulk material in a storage structure.

28 Claims, 15 Drawing Figures

APPARATUS FOR BOTTOM UNLOADING OF STORAGE STRUCTURES

FIELD OF THE INVENTION

This invention relates to techniques and apparatus for unloading bulk material from upright storage structures. More particularly, this invention relates to techniques and apparatus for unloading storage structures (such as silos) from the bottom thereof.

BACKGROUND OF THE INVENTION

Various types of bulk materials are often stored in large structures until it is necessary to use them. This may include, for example, bulk materials which are fibrous, granular, or finely divided materials. Common examples of such materials are silage, wood chips, coal, grain, and the like. The storage structures are generally cylindrical and may be of various diameters and heights.

When it is desired to remove some amount of the material from such storage structures, it is normally not possible to simply open a door at the bottom of the structure in order to let the material flow out. Fibrous materials, for example, will not flow. Finely divided or granular materials often will not flow properly if they become wet, frozen, or packed so tightly that they are bound together.

Although the bulk material could instead be removed from the storage structure from the top side, this would require that the structure have a series of doors or other such access openings at various heights in the wall of the structure. This not only adds to the expense of the structure but it also increases the likelihood that undesirable air leakage into the structure will result. This would also require that the unloading apparatus be adapted to deliver bulk material out one of the openings in the wall irrespective of the level of bulk material in the structure.

The use of bottom unloading devices is very desirable because the storage structure may be kept sealed, if necessary. Furthermore, there is no need to utilize a series of vertically spaced doors in the wall of the storage structure.

Various types of bottom unloading devices have been proposed for use in unloading silos and grain bins. These unloading devices typically include a sweep arm which pivots around a central opening in the floor of the structure. The arm conveys bulk material to the central opening where other conveyance means transports the material beyond the outer wall of the storage structure.

Some of these prior devices utilize a circular track on the floor of the storage structure to guide and, in some designs, to actually drive the outer end of the sweep arm around the floor. In some of these designs the track is located at a point between the center and the wall of the structure. See, for example, U.S. Pat. Nos. 1,275,558; 2,914,198; 3,289,862; and 3,367,519. In other designs the circular track is disposed within a recess in the wall. See, for example, U.S. Pat. Nos. 3,282,446; 3,298,543; 3,121,501; and Reissue Pat. No. 25,863. In still another design the circular track is adjacent the wall of the structure. See U.S. Pat. No. 3,237,788.

There are many disadvantages associated with these former designs. For example, special installation of the equipment is required. The circular track can only be installed when the storage structure is empty. Where the design requires a track recessed in the wall of the structure, it is necessary for the structure to be specially designed in order to accommodate the apparatus. As a practical matter, apparatus of such design would be used only in storage structures which had been built so as to specially accommodate such apparatus.

Where the design relies upon a separate motor inside the storage structure to drive the outer end of the sweep arm, additional complications are presented. Not only is there the greater risk of equipment failure owing to the presence of a second motor, there is also additional drive equipment within the storage structure which must be operating properly in order to produce the desired result.

In U.S. Pat. No. 2,969,156 another type of bottom unloading device is disclosed. This device also requires a specially designed storage structure having a truncated cone shaped bottom. The outer end of the sweep arm is connected to, and driven around the floor by, a carriage under the floor of the storage structure. Thus, for many reasons, this type of unloading apparatus has very limited application.

In U.S. Pat. No. 2,711,814 there is described apparatus which can be placed inside a grain bin after most of the grain has been removed through a central opening in the floor and the grain has reached an angle of repose between the floor and the side walls. The entire apparatus, including the drive motor, must be inserted into the bin from the top. This apparatus is not designed for use in unloading storage structures which are full, nor is it designed for use with bulk materials other than free flowing materials.

In U.S. Pat. No. 2,934,224 there is described another type of unloading apparatus for use in unloading grain from a bin. This apparatus uses a drag brake to control the pivoting of the sweep auger.

Other types of bottom unloading devices are described in U.S. Pat. Nos. 2,675,931 and 2,635,770. These designs utilize an endless chain having teeth to dislodge bulk material and convey it out of the silo. The large number of articulating joints in the chain result in a need for additional maintenance and frequent adjustments to compensate for chain wear and resultant change in chain length. Furthermore, the drive system for propelling the sweep arm is limited as to the maximum available torque and may not be adequate for large diameter storage structures (i.e., over about 21 feet in diameter). Moreover, the space available for appropriate gearing at the inner end of the sweep arm (at the center of the storage structure) inherently limits the horsepower that may be applied to the chain.

Other disadvantages are apparent in conventional chain-type unloaders. Because of the inherent flexibility of the chain, the cutters or teeth on the chain have a tendency to drag on the floor of the storage structure where the chain is at its lowest point. For this reason nearly all floors in storage structures accommodating chain-type unloaders are completely covered with a layer of steel sheets welded together at their edges. Continual wear on the sheets by the chain will eventually cause some of these welds to deteriorate, whereupon the edges of some sheets will buckle upwardly and be caught by the teeth on the chain. This is damaging, both to the teeth and the steel sheets, and in many cases requires that repairs to the floor be undertaken before further material can be removed from the storage structure. This type of repair, of course, is expensive and hazardous since it must be performed while a column of bulk material is still in the storage structure. Unfortunately, this is a rather common occurrence.

Still another disadvantage of chain-type unloaders is that they have a tendency to circulate air between the outside of the storage structure and the inside thereof, thus causing an undesirable increase in oxygen content within the structure and increasing the tendency of the bulk material to spoil.

Another problem associated with many of the prior designs for bottom unloading devices is that the sweep arm pivots at a constant rate. At times the sweep arm loosens bulk material faster than the discharge conveyor mechanism can remove the material from the storage structure. U.S. Pat. No. 3,298,543 describes one manner of alleviating this problem by providing control means which interrupts the pivoting of the sweep arm when the load on the discharge conveyor exceeds a given level.

Since the late 1940's a very large number of farm silos have been constructed using the bottom unloading principle. This market has been dominated by a single company which has constructed the vast majority of all such silos. When intended for the storage of forage materials, nearly all such silos have been built with a trough in the floor which is 7.5 inches deep and 24 inches wide and is intended to accept a chain type unloader manufactured by the same company. Tens of thousands of these unloaders are in current service and many of them reach the end of their useful life and require replacement each year.

Although many attempts have been made to devise an auger-type unloader which would fit directly into the trough of the type of silos described above, the dimensional limitations imposed by the trough size have defeated all such attempts prior to the present invention. The sweep auger requires a rather low rotational speed (under 100 revolutions per minute) with exceedingly high torque capability. Some types of forage materials (especially alfalfa haylage and the like) can be quite difficult to move. Consequently, the central area where the forage moves from the floor level into the trough (where it is moved by the discharge conveyor) must be kept as open as possible and free from impediments and obstructions which would interfere with free and ready movement of the material.

The apparatus and techniques of the present invention overcome these problems.

SUMMARY OF THE PRESENT INVENTION

In accordance with the present invention there are provided techniques and apparatus for the bottom unloading of bulk material from storage structures. The techniques and apparatus are suited to handle various types of bulk materials, including fibrous, granular and finely divided materials such as silage (e.g., haylage; corn silage; etc.), wood chips, grain, coal, etc. The apparatus of the invention, in one embodiment, includes (a) a sweep arm adapted to extend radially from the central opening in the floor to a point near the wall of a storage structure, the sweep arm being adapted to dislodge or loosen and then transport the bulk material to the central opening, wherein the sweep arm is adapted to pivot about the central opening;

(b) conveyor means operatively associated with the sweep arm and having a portion adapted to be disposed beneath the central opening in the floor, wherein the conveyor means is adapted to convey material from the central opening to a point beyond the wall of the storage structure;

(c) a power source adapted to power the sweep arm and the conveyor means; and (d) ratchet advancement means at the inner end of the sweep arm adapted to pivot the sweep arm about the central opening in such a manner that successive amounts of the bulk material are dislodged and transported to the central opening.

The sweep arm may utilize either an auger conveyor or an endless chain conveyor. In a preferred embodiment a planetary gear drive is used to transmit rotational energy generated by the power source to the operation of the sweep The unloading apparatus of this invention is adapted to fit within the radial trough of the most common sealed farm silos in existence. The apparatus, of course, is also useful in various other types of storage structures.

The unloading apparatus of the invention avoids the maintenance and wear problems associated with prior unloaders, and the apparatus also is simple in operation and has high material unloading capabilities. The apparatus may be installed in storage structures without the need for installing a track or similar equipment around the wall of the structure.

In another embodiment the invention provides conveyor means for a silo unloader including material-dislodging teeth. Each tooth comprises a pointed end carried by the leading end of a shank inclined in the direction of travel of the tooth. The conveyor means may comprise an auger or an endless chain.

BRIEF DESCRIPTION OF THE DRAWINGS

The invention is described in more detail hereinafter with reference to the accompanying drawings, wherein like reference characters refer to the same parts throughout the several views and in which.

DETAILED DESCRIPTION OF THE INVENTION

Figure 1:
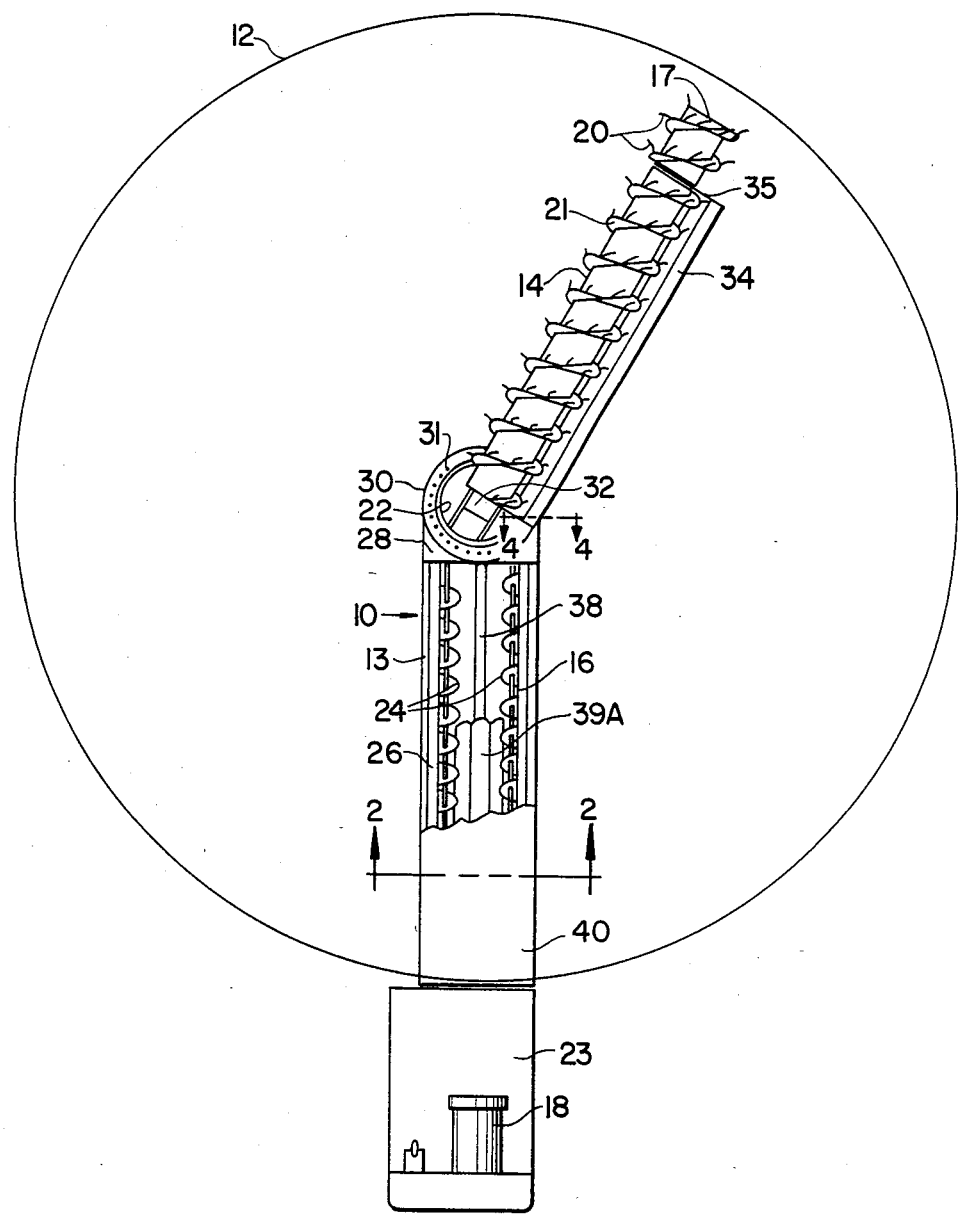
FIG. 1 is a top view of one embodiment of apparatus of this invention positioned in the bottom of a storage structure.
Figure 5:
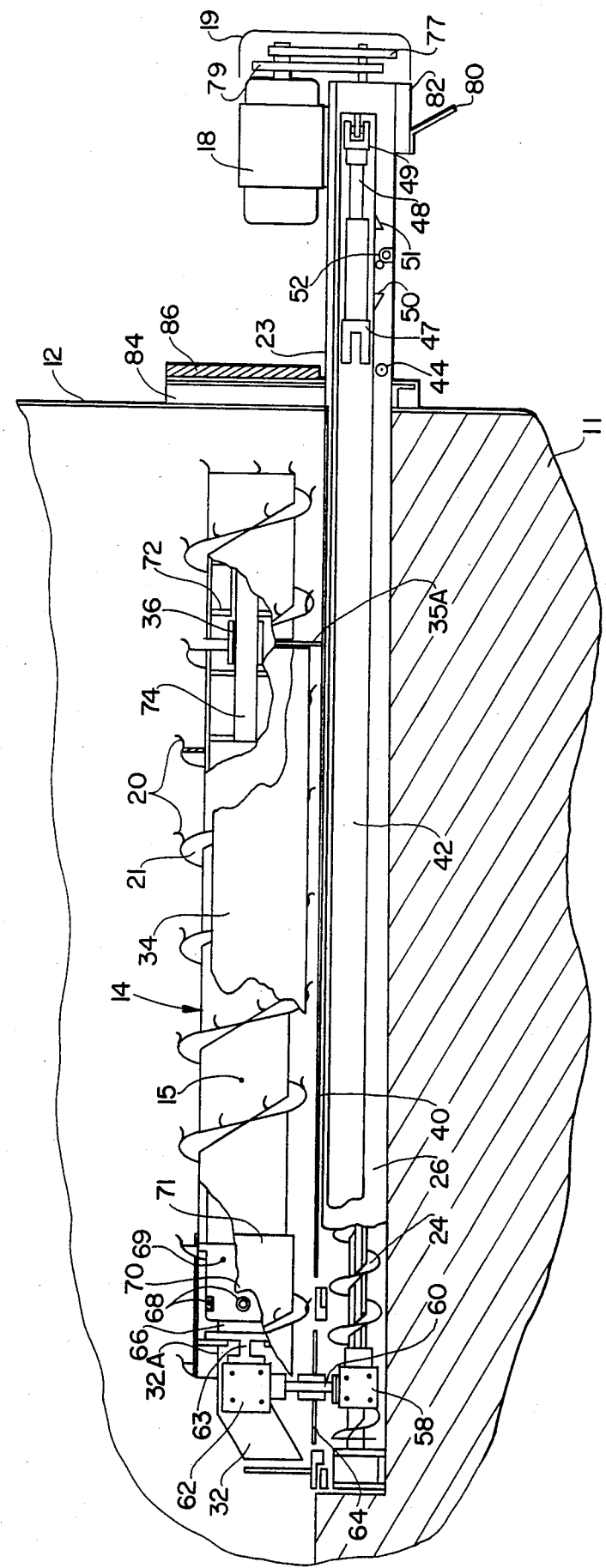
FIG. 5 is an elevational, partial cut-away, view of the apparatus shown in FIG. 1 with the sweep arm pivoted to a position directly over the discharge conveyance means.

Thus, in FIG. 1 there is shown a top view of one embodiment of bottom unloading apparatus 10 disposed within a cylindrical, upright storage structure having wall 12 and floor 11. FIG. 5 is a side view of the apparatus shown in FIG. 1 with the sweep arm pivoted to a position directly over the discharge conveyance means.

The apparatus 10 comprises a sweep arm 14 and discharge conveyor means 16 which is operatively associated with the sweep arm and is adapted to convey bulk material from the central area of the storage structure to a point beyond the wall. A power source 18 located outside the storage structure is adapted to power both the sweep arm 14 and the conveyor 16. The power source is preferably an electric motor, although an internal combustion engine could be used, if desired. When the storage structure has a diameter in the range of about 16 to 25 feet the power source is preferably about 5 to 10 horsepower.

In one embodiment, the sweep arm may comprise an auger housing or enclosure 15 having flights 21, as shown, or it may comprise an endless chain with teeth attached thereto at periodic intervals. Preferably there are a plurality of teeth 20 secured to the periphery of the flights 21 to penetrate and dislodge fibrous materials such as haylage and other hard-packet material. In essence the sweep arm pivots about the central axis of the storage structure for the purpose of dislodging or loosening the bulk material and transporting or delivering the bulk material to the discharge conveyor means 16. The outer end 17 of the sweep arm extends to a point near the wall of the storage structure. When the bulk material is silage, for example, the outer end of the sweep arm is spaced from the wall about two to eight inches. The proximity of the outer end of the sweep arm to the wall of the structure is related to the shear strength of the bulk material. Free flowing materials have essentially zero shear strength and the clearance between the sweep arm and the wall is of little importance. In very cold weather some types of bulk material may become frozen to the wall and it is accordingly desirable to have the sweep arm extend very close to the wall.

Preferably the floor 11 of the storage structure includes a radial trough or recess 13 which extends from the center to the outside wall of the structure. Structures including this type of trough or recess in the floor are extremely common, with the depth of the trough being 7.5 inches and the width being 24 inches. Of course, the apparatus of this invention is also adaptable for use in storage structures having troughs of other dimensions also.

The trough or recess 13 accommodates the discharge conveyor mechanism 16. The sweep arm 14 is disposed just above the discharge conveyor 16 and is adjacent the floor 11 of the storage structure, as shown in FIG. 5. As the sweep arm pivots about the central axis of the storage structure, the bulk material is dislodged and moved to the center where it falls through vertical opening 22 due to gravity into the discharge conveyor 16.

The discharge conveyor means 16 preferably comprises two discharge augers 24, as shown in FIG. 1. If desired, the discharge conveyor may comprise one auger or an endless chain with material-conveying paddles thereon. A typical size for augers 24 is about six inches in diameter.

The discharge augers 24 are suitably contained within a frame having side members 26 and an inner end which includes center support weldment 28. The support weldment 28, which is stationary, includes a large circular opening therethrough which is normally coaxial with the central axis of the storage structure. When two augers are used it is preferable to include a conventional distributor 64 (shown in FIG. 5) in central opening 22 for the purpose of distributing the material between the two augers. The distributor 64 may be of any conventional design and may be rotated by virtue of its connection to rotating shaft 60.

The side frame members 26 and the discharge conveyor apparatus extend along the length of the radial trough and beyond the wall of the storage structure through an access opening. A frame 84 surrounds the access opening and a door 86 closes the portion of the opening not occupied by the unloading apparatus. On the underside of the discharge conveyor apparatus there is a discharge opening 82 for the material to be unloaded through. A hinged door 80 may be closed when the apparatus is not in use. The door 80 may be made of neoprene or other suitable material so that it is capable of being sealed tightly when closed to prevent air from entering the storage structure. During unloading operations the augers do not circulate air into the storage structure as chain conveyors are prone to do.

Figure 8:
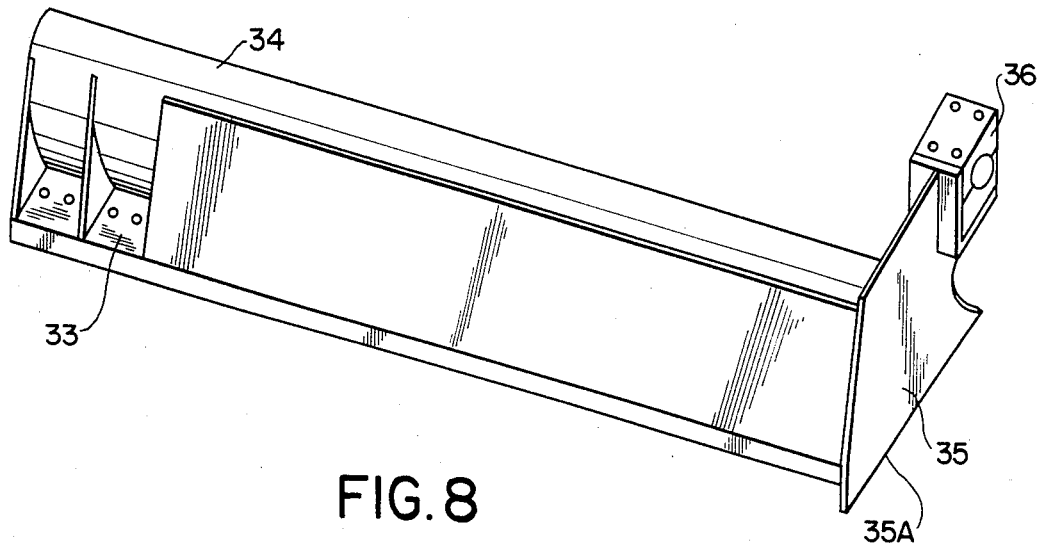
FIG. 8 is a perspective view of the trailing shield adapted to trail the sweep auger and prevent the material from escaping as the auger rotates.

Trailing shield 34 (shown in FIGS. 1, 5 and 8) extends along much of the length of the sweep arm and is positioned in close proximity to the auger. Preferably the portion of the trailing shield closest to the auger is slightly concave so as to conform to the general curvature of the auger. The trailing shield retains loosened bulk material close to the auger so that rotation of the auger causes the material to be moved by the flights 21 towards the central opening 22.

The inner end 33 of the trailing shield is conveniently secured to support or bracket 30b (shown in FIG. 3) carried by ratchet ring 30. The outer end of the trailing shield comprises a plate 35 including a bearing 36 which is adapted to surround rotatable shaft 74 within auger casing 15. Disc-shaped supports or spacers 72 are disposed between shaft 74 and auger casing 15. The bottom edge 35a of plate 35 is adapted to rest upon floor 11 of the storage structure and slide along the floor as the sweep arm pivots. Thus, plate 35 also serves as a support for the outer end of the sweep arm to hold it up off the floor of the storage structure. Thus, the floor (whether concrete or steel is not subjected to wear from the action of the cutting teeth. Accordingly, there is no problem associated with floor maintenance.

Figure 3:
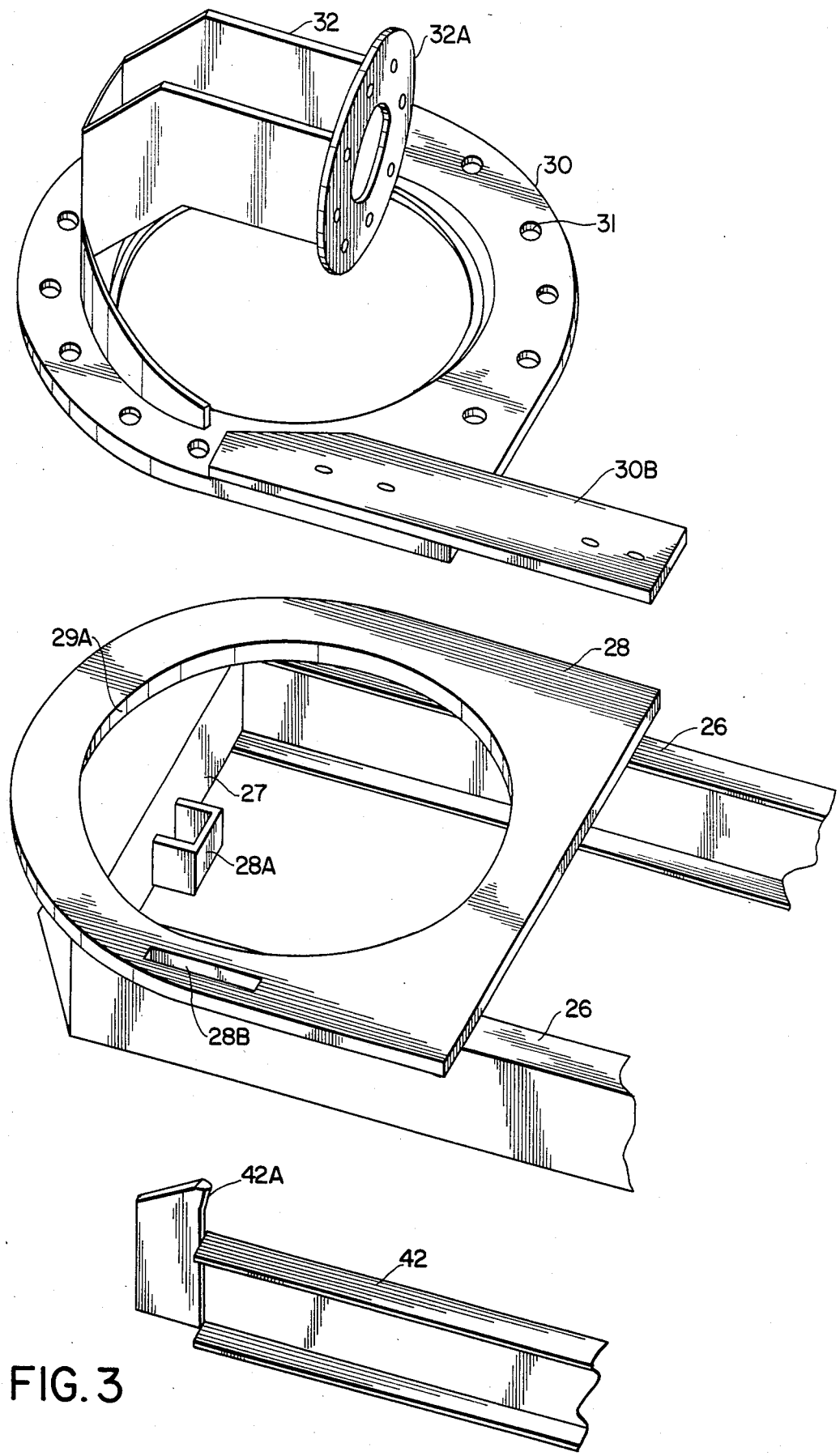
FIG. 3 is an exploded view of a portion of the apparatus of FIG. 1 showing one manner in which the inner end of the sweep arm is adapted to be pivotably mounted above the inner end of the discharge conveyance means.

FIG. 3 is an exploded view of the central portion of the unloading apparatus showing ratchet ring 30, support weldment 28, and pawl arm 42. Attached to ratchet ring 30 is upstanding support structure 32 including mounting bracket or plate 32a. Ratchet ring 30 also includes engagement means spaced around the periphery thereof. The engagement means as shown in the drawings comprises a plurality of openings 31. Other types of engagement means include recesses in ratchet ring 30, a plurality of teeth secured to ring 30, etc. In other words, the engagement means may be any structure which enables the inner end of the pawl arm to engage the ratchet ring when the pawl arm is moved outwardly.

Support weldment 28 is securely fastened to frame members 26 and includes a large central opening therethrough which enables loosened bulk material moved by the sweep arm to the center of the storage structure to fall into the area between frame members 26 where the discharge conveyor is located. Bracket 28a is carried by a cross-member 27 between sides 26. The bracket 28a serves as an attachment for an anchor in the floor of the radial trough. The attachment of an anchor (e.g., a bolt or hook) to bracket 28a may be useful in holding the apparatus securely in position in spite of the forces associated with pivoting of the sweep arm around the inside of the storage structure.

Slot 28b in weldment 28 accommodates finger or hook 42a of pawl arm 42 during operation of the apparatus. The finger 42a passes through slot 28b and engages openings 31 in ratchet ring 30, as is more particularly described hereafter.

Figure 4:
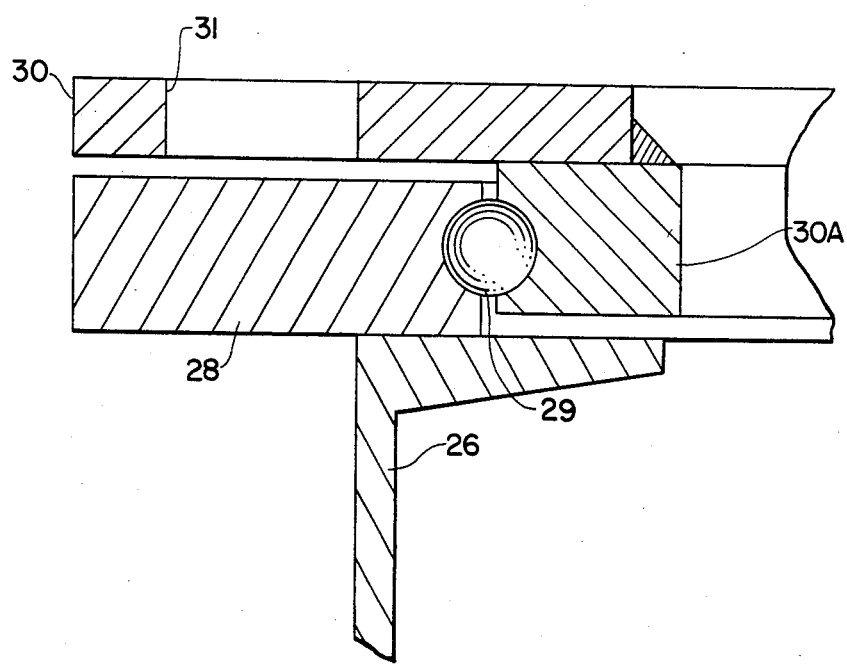
FIG. 4 is a cross-sectional view of a portion of the apparatus shown in FIG. 1 showing the manner in which the inner end of the sweep arm is pivotably mounted to the frame at the inner end of the discharge conveyance means.

Around the inside of the central opening in weldment 28 is annular race 29a. The underside of ratchet ring 30 includes a downwardly depending annular flange 30a (shown in FIG. 4) which also includes an annular race. A plurality of ball bearings 29 are disposed between flange 30a and weldment 28 within the opposing races. Thus, ratchet ring 30 is adapted to pivot with respect to weldment 28 during operation of the apparatus, as described hereafter.

Figure 2:
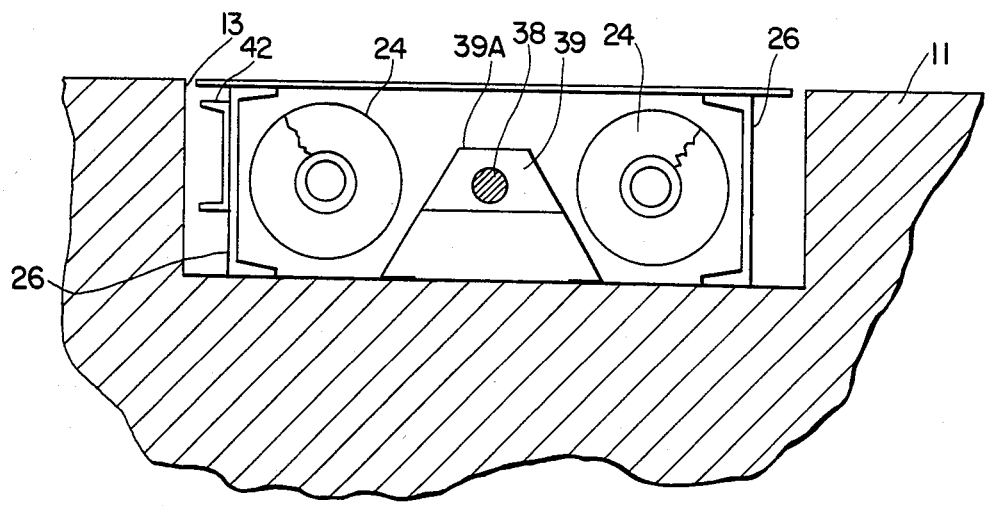
FIG. 2 is a cross-sectional view of the discharge conveyor portion of the apparatus shown in FIG. 1.

FIG. 2 is a cross-sectional view through the discharge conveyor mechanism, taken along line 2—2 in FIG. 1. Augers 24 are shown between spaced side frames 26. Pawl arm 42 is positioned on the outside of frame 26. Cover plate 40 covers the apparatus and is supported by the top edges of frames 26. Elongated rotatable shaft 38 is powered by motor 18 and extends through trough 13 along the length thereof to gear box 58 (shown in FIG. 5). Shaft 38 is covered by shield 39a along its length, and a number of bearings 39 support shaft 38 periodically along its length. Bearings 39 are supported by shield 39a.

Figure 6:
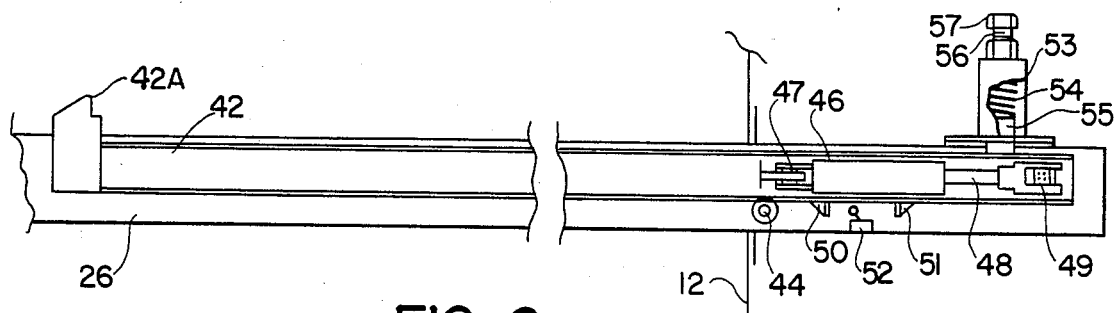
FIG. 6 is an elevational view of the pawl means which is adapted to engage the ratchet ring at the inner end of the sweep arm.

Additional details of the apparatus are shown in FIGS. 5 and 6. Gear box 58 contains bevel gears which are adapted to translate rotational motion of horizontal shaft 38 to vertical shaft 60. Gear box 62 also contains bevel gears which are adapted to translate rotational motion of vertical shaft 60 to horizontal shaft 63. Mounted to plate 32a is planetary gear drive means 66. Shaft 63 is operably connected to the planetary gear drive means 66. The inner end 71 of auger tube 15 is secured to the planetary gear housing 69 by means of threaded bolts or cap screws 68 which extend through openings 70 in the inner end 71 of auger tube 15, as shown. The planetary gear drive means is commercially available (e.g., from Borg Warner, Models 6, 8 or 10) and is adapted to convert high rotational shaft speed of low torque to low rotational shaft speed of high torque.

Very distinct advantages are obtained with the design of this invention where the power required for rotating the sweep auger enters the sweep auger at high rotational speed and low torque and is then converted to the high torque and low speed required for most advantageous operation of the auger. The gear boxes 58 and 62 which are in the path of the bulk material being unloaded are consequently smaller in proportion to the reduction in the torque requirement. As a result, there is less obstruction to the flow of the bulk material during the unloading process than would otherwise be the case.

The planetary gear drive means may be wholly contained within the inner end 71 of the auger itself so that it does not interfere with the flow of the material being unloaded. Preferably, the planetary gear drive means is capable of reducing the rotational input speed by a ratio of at least 5:1, preferably 20:1, and more preferably 40:1.

In prior designs of sweep augers the diameter of the auger tube was determined by the flexural loads imposed by the bulk material which settles onto the auger (especially while at rest). Accordingly, the maximum tube diameter of previous commercial sweep augers has been about 4.5 to 5 inches. In the present invention the planetary gear drive means is contained within the auger tube or enclosure and in order to do this the auger tube is quite large, e.g., 10 to 12 inches or more in the preferred embodiment.

The apparatus of this invention is adaptable for unloading storage structures of various diameters, with a diameter in the range of about 16 to 30 feet or more being the most common. The diameter of the auger tube 15 may also vary, although a diameter in the range of about 10 to 20 inches is generally most convenient and useful for most purposes.

In another variation, the sweep arm may utilize a segmented auger system of the type described in my co-pending application Ser. No. 06/567,899, filed of even date and incorporated herein by reference.

Figure 9:
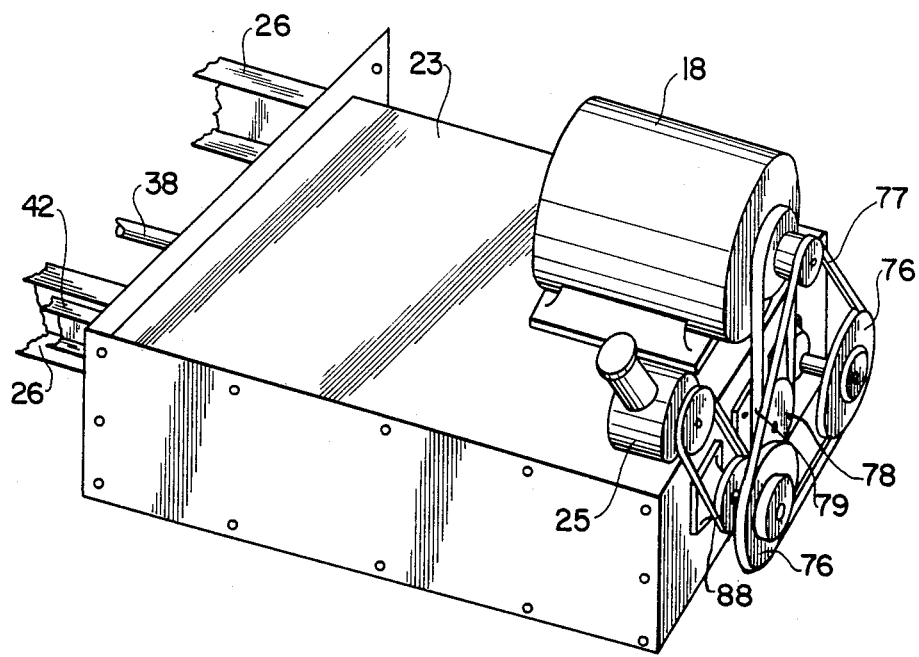
FIG. 9 is a perspective view of the outer end of the discharge conveyance means showing the power source and drive means.

As shown in FIGS. 1, 5 and 9, motor 18 is mounted on housing 23 on the outside of the storage structure. The motor powers pulleys 76 by means of belt 77. Pulleys 76 are connected to appropriate shafts for driving discharge augers 24. One of the shafts also carries a pulley which drives hydraulic pump 25 by means of belt 88. Motor 18 also powers pulley 78 which is operably connected to elongated shaft 38. Guard or cover 19 is preferably mounted over the belts and pulleys as a safety measure to prevent accidental contact therewith.

Pawl arm 42 is elongated and extends from a point outside the storage structure to the inner end of the unloading apparatus at the center of the storage structure. The pawl arm 42 is pivotably supported between its ends by cam 44 carried by one side frame 26 (as shown in FIGS. 5 and 6). The outer end of pawl arm 42 is biased downwardly by bias means 53 in which spring means 54 pushes downwardly against block member 55 resting on the top edge of pawl arm 42 near its outer end. Threaded shaft 56 may be turned downward or upward by knob 57 to increase or decrease the level of the biasing force, as desired.

Hydraulic cylinder 46 includes ram 48 which may be extended and retracted as needed for desired movement of the pawl arm inwardly or outwardly. End 47 of cylinder 46 is mounted to a stationary frame support (not shown) and end 49 of the cylinder is mounted to pawl arm 42. Accordingly, extension of ram 48 causes the pawl arm 42 to move outwardly, and retraction of the ram 48 causes the pawl arm to move inwardly. The finger 42a on the inner end of pawl arm 42 extends upwardly through slot 28b in plate 28 and is adapted to engage one of the openings 31 in ratchet ring 30. When the pawl arm is then moved outwardly by extension of ram 48, the pawl arm and finger cause the ratchet ring (and thus the sweep arm 14) to pivot slightly with respect to plate 28 in a horizontal plane. Then ram 48 is retracted and pawl arm 42 is moved inwardly. Because the backside of finger 42a is sloped, inward movement of the pawl arm and finger causes the inner end of the pawl arm to be pushed downward (while the outer end is pushed upward against the bias means) so that the finger disengages the opening 31 in ratchet ring 30. Sufficient inward movement of pawl arm 42 enables finger 42a to engage the next opening 31 in ratchet ring 30 and the process is repeated.

In a preferred embodiment two opposing stop members or cams 50 and 51 are carried on the lower edge of the pawl arm 42. A switch 52 is mounted on the frame member 26 between the stops 50 and 51. As the pawl arm moves inwardly the desired distance, stop 51 trips the switch from one position to another to cause the hydraulic system to extend ram 48. As the pawl arm moves outwardly the desired distance, stop 50 trips the switch to its first position and the hydraulic system operates to retract ram 48.

Figure 7:
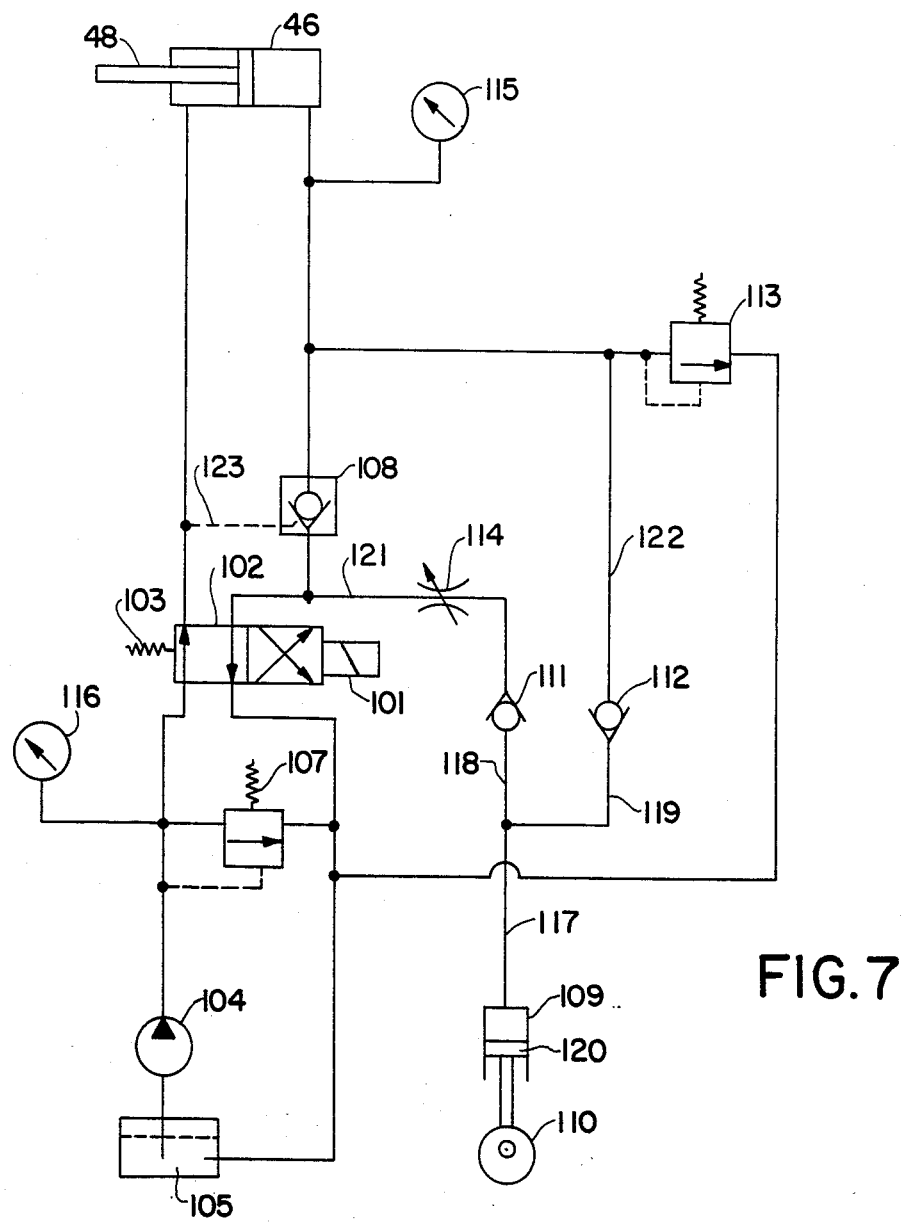
FIG. 7 is a schematic diagram of the hydraulic system controlling the operation of the pawl means.

In FIG. 7 there is shown a schematic diagram of one useful hydraulic system for controlling the operation of hydraulic cylinder 46 and ram 48. As explained above, movement of the ram 48 causes the pawl arm 42 to move alternately inwardly and outwardly in a manner such that finger 42a at the inner end of pawl arm 42 engages openings 31 in ratchet ring 30 and causes the sweep arm to pivot incrementally around the central opening the floor of the storage structure.

Since it is desirable at times for the operator to be able to interrupt the pivoting (i.e., advancement) of the sweep arm, a manually operated switch (not shown) is provided at a convenient location. When the switch is in the "off" position, no electrical current flows to solenoid coil 101 which is operably associated with valve 102. When the coil is thus de-energized the spool in valve 102 is caused to shift (by virtue of spring 103) to a position enabling hydraulic fluid, urged by pump 104, to flow from reservoir 105 toward the ram end of cylinder 46. The piston and ram of cylinder 46 will then retract, causing pawl arm 42 to move inwardly toward the center of the storage structure. When the ram 48 is fully retracted, hydraulic fluid is diverted by relief valve 107 back to reservoir 105. The hydraulic fluid flow rate is preferably low (e.g., about 1.2 gallons per minute).

When it is desired to begin the advancement of the sweep arm, the electric control switch is moved to the "on" position. This energizes the solenoid coil 101 causing the spool of valve 102 to shift. Then fluid in the ram end of cylinder 46 is provided with a direct connection to reservoir 105. At the same time, pressurized fluid from pump 104 is caused to flow toward the piston end of cylinder 46. Most of the fluid will flow through check valve 108 into the piston end of cylinder 46, thereby causing extension of ram 48 and consequent movement of pawl arm 42 outwardly toward the outside of the storage structure. The pawl arm finger 42a on the inner end of the pawl arm 42 engages one of the openings 31 in ratchet ring 30 and pivots the sweep arm in an advancing motion. Movement of the sweep arm is restrained by the presence of bulk material in its path which must be progressively removed in order to permit further advancement of the sweep arm. When further extension of ram 48 is thus impeded, the full volume of hydraulic fluid supplied by pump 104 cannot continue to flow into the piston end of cylinder 46; surplus fluid is thus diverted through relief valve 107 to reservoir 105.

Piston 120 is caused to reciprocate in cylinder 109 by the action of rotating cam 110; this results in intermittent low pressure in conduits 117, 118 and 119. Fluid in conduit 121 (which is at a pressure approximately the pressure setting of relief valve 107) passes through adjustable metering valve 114 and check valve 111 into conduit 118. When piston 120 reduces the volume of cylinder 109 the fluid which has passed through check valve 111 is forced to pass through check valve 112. As piston 120 continues to reciprocate in cylinder 109 an amount of fluid controlled by adjustable metering valve 114 is being pumped from conduit 121 to conduit 122. In the preferred embodiment the amount of fluid thus pumped into conduit 122 is small (e.g., having a flow rate of about 15 cubic inches per minute). This fluid is required to either pass into the piston end of cylinder 46 or to return to reservoir 105 through relief valve 113. Preferably relief valve 113 is set at a rather high pressure (e.g., 3000 psi). Cylinder 46 consequently is acted upon by this high pressure and ram 48 gradually is extended, causing pawl arm 42 to move outwardly and the sweep arm to pivot and to be advanced into the bulk material at a slow and controlled rate. For example, it may take several minutes for ram 48 to be fully extended.

As shown in FIGS. 5 and 6, when ram 48 nears the end of its outward stroke a cam or stop 50 carried by pawl arm 42 is adapted to move electrical limit switch 52 from a first position to a second position. Switch 52, which is in the closed position during the extension of ram 48, is opened by the action of cam or stop 50, thus interrupting current flow to solenoid 101. Spring 103 then shifts the spool in valve 102, whereby hydraulic fluid flows directly to the ram end of cylinder 46 from pump 104. Fluid pressure acting on the ram end of cylinder 46 is conveyed to check valve 108 through conduit 123, causing the check valve to open and allow fluid to flow from the piston end of the cylinder through valve 102 to reservoir 105. Ram 48 then quickly retracts, causing pawl arm 42 to move inward toward the center of the storage structure.

As ram 48 nears the end of its retraction stroke a second cam or stop 51 carried by the pawl arm pushes the switch to its other position. The solenoid 101 is again energized, the value 102 is actuated so that cylinder 46 begins another outward stroke, and the entire cycle is repeated.

Fluid pressure gauges 115 and 116 may be provided to indicate the fluid pressure in the conduits with which they are associated. Because of the high pressures in conduits 117, 118 and 119, and because of the pulsating nature of this pressure, it is preferred that these conduits be made of steel or other suitable inelastic and durable material.

Figure 10:
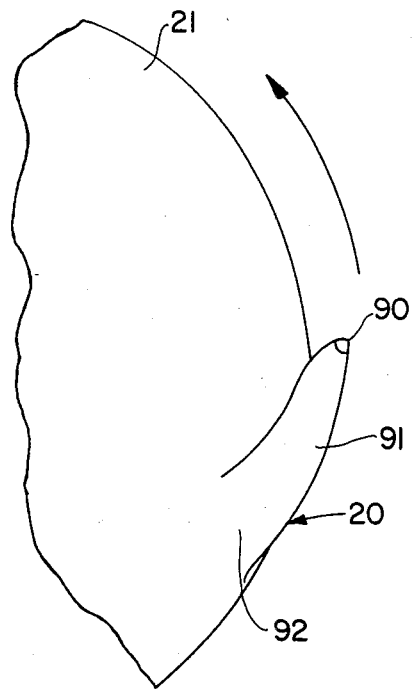
FIG. 10 is a side view of a portion of an auger which includes a tooth member adapted to penetrate and dislodge bulk material in a storage structure.
Figure 11:
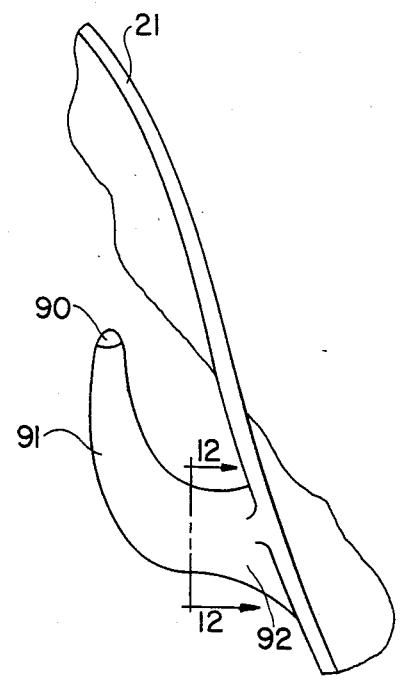
FIG. 11 is a top view of the structure shown in FIG. 10.

In FIGS. 10 and 11 there is shown a material-dislodging tooth 20 carried by flight 21 of an auger conveyor. Tooth 20 projects outwardly from the flight 21 (both laterally and upwardly) and includes a pointed end carried by the leading end of a shank 91 inclined in the direction of travel of the tooth (indicated by the arrow in FIG. 10). Shank 91 is attached to and supported by mounting means 92 which is carried by flight 21. The mounting or supporting means 92 has a curved leading surface.

Figure 12:
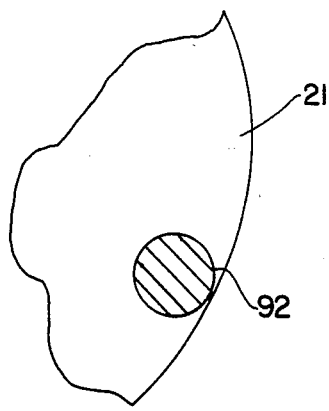
FIG. 12 is a cross-sectional view through the mounting means for mounting the tooth to the auger.

FIG. 12 is a cross-sectional view through supporting means 92, taken along line 12—12 in FIG. 11. As shown in FIG. 12, a presently preferred shape for the leading edge of the support means is semi-circular. The radius of curvature of he leading edge is preferably at least about 0.1 inch, and more preferably at least about 0.2 inch. The reason for having a curved leading surface is to prevent hair-pinning of fibrous bulk material on the support means during operation. It has been observed that if the leading surface of the support means is not sufficiently curved, certain fibrous materials (such as haylage) tend to hair-pin on the support means and eventually form a clog on the tooth and consequently reduce the ability of the tooth to penetrate and dislodge additional bulk material.

Shank 91 extends generally rearwardly from pointed tip 90 so that material penetrated by tip 90 will slide directly away from the tip without resistance. The loosened material will continue to wipe clean the curved leading surface of the support means 92 which extends generally transversely with a smooth curved leading surface free of sharp edge which would tend to cause hair-pinning.

The tip 90 of tooth 20 is pointed and may have a conical point, pyramidal point, chisel point, etc. Preferably tip 90 is made of a hard, durable, wear-resistant material such as tungsten carbide to increase wear life.

The length of shank 91 may vary, but generally speaking it has been found that a length in the range of about 1.5 to 4 inches is very useful for most purposes. The diameter of shank 91 may also vary. A very useful diameter is in the range of about 0.5 to one inch.

Figures 13, 14:
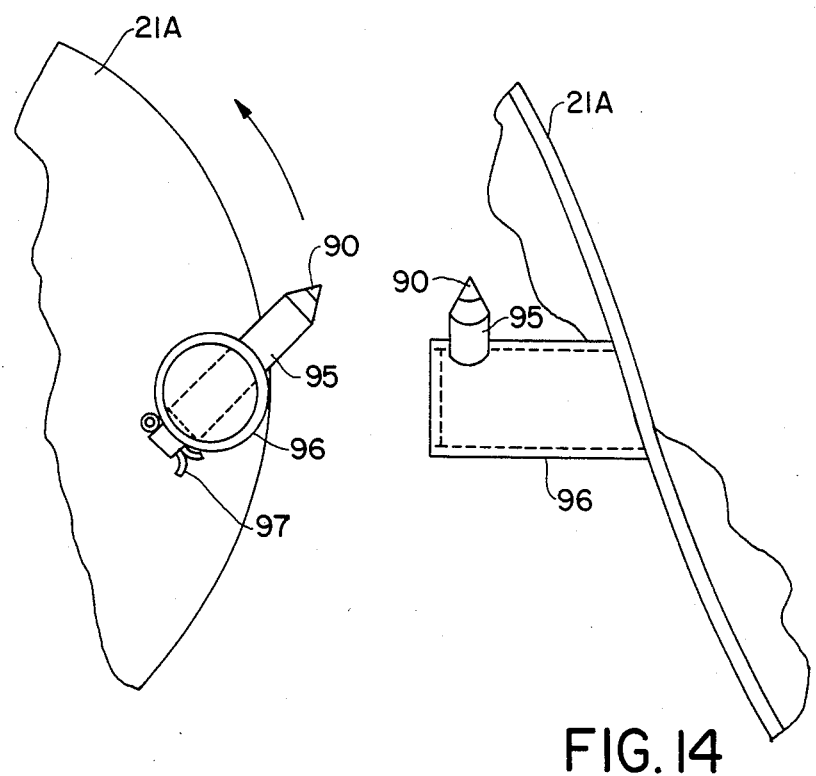
FIG. 13 is a side view of a portion of an auger which includes another type of tooth member and means for mounting.
FIG. 14 is a top view of the structure shown in FIG. 13.

FIGS. 13 and 14 illustrate another type of mounting of a tooth on flight 21a of an auger. In this embodiment the tooth is replaceable as desired. Pointed tip 90 is attached to the leading end of shank 95 which is inclined generally toward the direction of travel of the flight 21a. The rearward portion of shank 95 is attached to and supported by mounting means 96. For example, shank 95 may be received in an opening extending through mounting means 96. The rearward end of shank 95 is of slightly smaller diameter than the remainder of the shank, and the opening on the trailing edge of mounting means 96 is also of a smaller diameter than the opening on the leading edge thereof. A cotter pin 97 through the rearward end of shank 95 secures the tooth in place. Removal of cotter pin 97 enables the tooth to be removed and a replacement tooth inserted.

The mounting means 96 is shown as a cylindrical body. This type of mounting means is very useful when used in environments where fibrous materials are not present in significant amounts.

Figure 15:
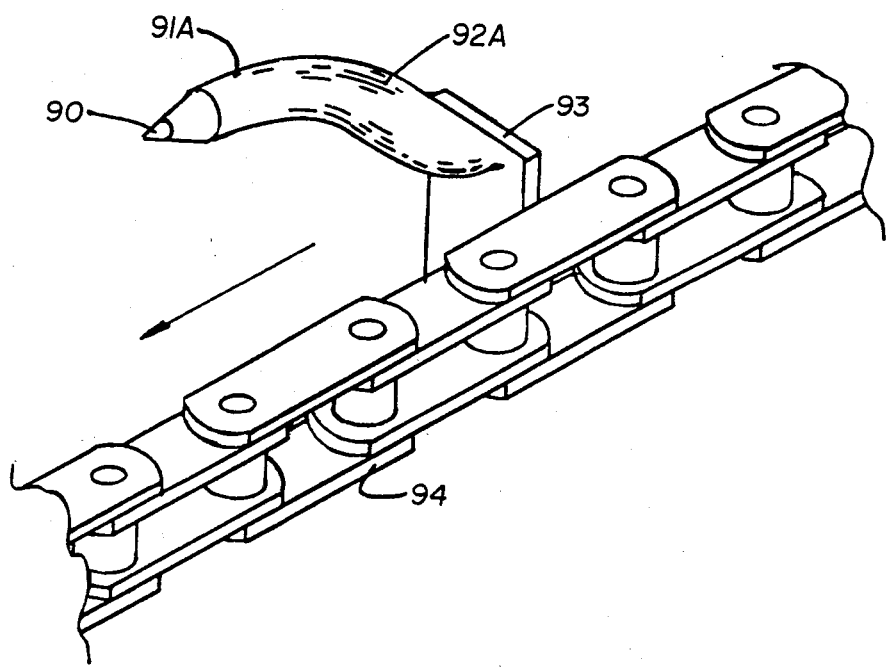
FIG. 15 is a perspective view of a chain to which is mounted a tooth member adapted to penetrate and dislodge bulk material in a storage structure.

The penetrating tooth concept described herein is also useful in connection with other types of apparatus besides augers. For example, in FIG. 15 there is shown a portion of an endless chain 94 having a tooth mounted thereon. Pointed tip 90 is secured on the leading end of shank 91a which is inclined in the direction of travel of the chain (as indicated by the arrow). The shank 91a extends rearwardly and is connected to a transversely extending portion 92a which has a curved leading surface. Mounting bracket 93 secured to one of the links in chain 94 is affixed to portion 92a, as shown.

The apparatus shown in FIGS. 10–15 which include a plurality of penetrating and material-dislodging teeth are useful in various applications. Of course, such apparatus has particularly useful application in unloading bulk material from a storage structure, such as a silo. The apparatus may be used for either top unloading or bottom unloading techniques.

Other variants are possible without departing from the scope of the present invention.

What is claimed is:

1. Apparatus for unloading bulk material from a centrally located opening in the floor of a generally cylindrical storage structure, said apparatus comprising:
   (a) a sweep arm comprising an auger which is adapted to extend radially from said central opening to a point near the wall of said structure, said sweep arm being adapted to dislodge and transport said material from said storage structure to said opening; wherein said sweep arm is adapted to pivot about said central opening;
   (b) conveyor means operatively associated with said sweep arm and having a portion adapted to be disposed beneath said central opening; wherein said conveyor means is adapted to convey said material from said opening to a point beyond the wall of said storage structure;
   (c) a power source adapted to power said sweep arm and said conveyor means; and
   (d) ratchet advancement means at the inner end of said sweep arm adapted to pivot said sweep arm about said central opening in such a manner that successive amounts of said bulk material are dislodged and transported to said opening; wherein said ratchet advancement means comprises (i) a ratchet ring to which the inner end of said sweep arm is attached, wherein said ratchet ring includes engagement means spaced therearound, (ii) pawl means including a finger which is adapted to engage said engagement means when said pawl means is moved in a first direction and is further adapted to disengage said engagement means when said pawl means is moved in a second direction, wherein said pawl means extends from said ratchet ring to the wall of said storage structure; and (iii) reciprocating means adapted to move said pawl means alternatively in said first and second directions; wherein said reciprocating means is located externally of said storage structure.

2. Apparatus in accordance with claim 1, further comprising a plurality of material-dislodging teeth carried by said auger and projecting outwardly therefrom, wherein said teeth comprise a pointed end carried by the leading end of a shank inclined in the direction of travel of said teeth.

3. Apparatus in accordance with claim 1, wherein said power means comprises an electric motor which is adapted to power a rotatable shaft, and wherein the rotational energy of said rotatable shaft is conveyed to said auger, for rotating the auger about its own axis, through planetary gear means.

4. Apparatus in accordance with claim 3, wherein said auger is elongated and has a hollow inner end and an outer end, and wherein said planetary gear means is disposed within said auger at the inner end thereof.

5. Apparatus in accordance with claim 3, wherein said planetary gear means is adapted to effect a rotational speed reduction of at least 5:1.

6. Apparatus in accordance with claim 1, wherein said pawl means comprises an elongated arm supported on a pivot point between its ends, wherein said finger is carried by the inner end of said arm, and wherein the outer end of said arm is downwardly biased by resilient force means.

7. Apparatus in accordance with claim 1, wherein said reciprocating means comprises a hydraulic cylinder including a ram moveable in first and second directions.

8. Apparatus in accordance with claim 7, further comprising switch means which is adapted to change the direction of movement of said ram.

9. Apparatus in accordance with claim 1, wherein said conveyer means comprises at least one auger.

10. In combination, a generally cylindrical storage structure for bulk material including a floor having a centrally located opening and a radial trough therein, and unloading apparatus to unload said bulk material from the bottom of said storage structure; wherein said apparatus comprises:
(a) a sweep arm adjacent said floor, said arm comprising an auger extending radially from said central opening to a point near the wall of said structure, said sweep arm being adapted to dislodge and transport said material from said storage structure to said opening; wherein said sweep arm is adapted to pivot about said central opening;
(b) conveyer means beneath said opening and within said trough which is adapted to convey said material from said opening to a point beyond the wall of said storage structure;
(c) a power source adapted to power said sweep arm and said conveyor means; and
(d) ratchet advancement means at the inner end of said sweep arm adapted to pivot said sweep arm about said central opening in such a manner that successive amounts of said bulk material are dislodged and transported to said opening; wherein said ratchet advancement means comprises (i) a ratchet ring to which the inner end of said sweep arm is attached, wherein said ratchet ring includes engagement means spaced therearound; (ii) pawl means including a finger which is adapted to engage said engagement means when said pawl means is moved in a first direction and is further adapted to disengage said engagement means when said pawl means is moved in a second direction, wherein said pawl means extends from said ratchet ring to the wall of said storage structure and wherein said pawl means is parallel to the center line of said trough; and (ii) reciprocating means adapted to move said pawl means alternatively in said first and second directions; wherein said reciprocating means is located externally of said storage structure.

11. A combination in accordance with claim 10, further comprising a plurality of material-dislodging teeth carried by said auger and projecting outwardly therefrom, wherein said teeth comprise a pointed end carried by the leading end of a shank inclined in the direction of travel of said teeth.

12. A combination in accordance with claim 10, wherein said power means comprises an electric motor which is adapted to power a rotatable shaft, and wherein the rotational energy of said rotatable shaft is transmitted to said auger, for rotating the auger about its own axis, through planetary gear means.

13. A combination in accordance with claim 12, wherein said auger is elongated and has a hollow inner end and an outer end, and wherein said planetary gear means is disposed within said auger at the inner end thereof, and wherein said planetary gear means is adapted to effect a rotational speed reduction of at least 5:1.

14. A combination in accordance with claim 10, wherein said pawl means comprises an elongated arm supported on a pivot point between its ends, wherein said finger is carried by the inner end of said arm, and wherein the outer end of said arm is downwardly biased by resilient force means.

15. A combination in accordance with claim 10, wherein said reciprocating means comprises a hydraulic cylinder including a ram moveable in first and second directions.

16. Apparatus for unloading bulk material from a centrally located opening in the floor of a generally cylindrical storage structure, said apparatus comprising:
(a) a sweep auger adapted to extend radially from said central opening to a point near the wall of said structure, said sweep auger being adapted to dislodge and transport said material from said storage structure to said opening; wherein said sweep auger is adapted to pivot about said central opening;
(b) conveyor means operatively associated with said sweep auger and adapted to be disposed in a recess in said floor, wherein one end of said conveyor means is disposed beneath said central opening, and wherein said conveyor means comprises at least one auger which is adapted to convey said material from said opening to a discharge point beyond the wall of said storage structure;
(c) connection means adapted to pivotably connect the inner end of said sweep auger to the inner end of said conveyor means;
(d) a power source adapted to power said sweep auger and said conveyor means; and
(e) ratchet advancement means at the inner end of said sweep auger adapted to pivot said sweep auger about said central opening in such a manner that successive amounts of said bulk material are dislodged and transported to said opening; wherein said ratchet advancement means comprises (i) a ratchet ring to which the inner end of said sweep auger is attached, wherein said ratchet ring includes engagement means spaced therearound; (ii) pawl means including a finger which is adapted to engage said engagement means when said pawl means is moved in a first direction and is further adapted to disengage said engagment means when said pawl means is moved in a second direction, wherein said pawl means extends from said ratchet ring to the wall of said storage structure, and (iii) reciprocating means adapted to move said pawl means alternatively in said first and second directions; wherein said reciprocating means is located externally of said storage structure.

17. Apparatus in accordance with claim 16, further comprising a plurality of material-dislodging teeth carried by said auger and projecting outwardly therefrom, wherein said teeth comprise a pointed end carried by the leading end of a shank inclined in the direction of travel of said teeth.

18. Apparatus in accordance with claim 16, wherein said power means comprises an electric motor which is adapted to power a rotatable shaft, and wherein the rotational energy of said rotatable shaft is transmitted to said auger, for rotating the auger about its own axis, through planetary gear means.

19. Apparatus in accordance with claim 18, wherein said auger is elongated and has a hollow inner end and an outer end, and wherein said planetary gear means is disposed within said auger at the inner end thereof.

20. Apparatus in accordance with claim 16, wherein said pawl means comprises an elongated arm supported on a pivot point between its ends, wherein said finger is carried by the inner end of said arm, and wherein the outer end of said arm is downwardly biased by resilient force means.

21. Apparatus in accordance with claim 16, wherein said reciprocating means comprises a hydraulic cylinder including a ram moveable in first and second directions.

22. Apparatus in accordance with claims 16, wherein said connection means comprises (a) a downwardly depending annular flange carried by said ratchet ring, said flange including a first annular race, (b) a second annular race at the inner end of the frame of said conveyer means, said second annular race being aligned with said first race, and (c) a plurality of ball bearings retained in the area defined by said first and second annular races.

23. In a silo unloader of the type having auger conveyor means for conveying bulk material to the central area of a silo for discharge therefrom said auger conveyor means being adapted to rotate about a rotational centerline, and said auger conveyor means including flighting having a front and rear surface, wherein said front surface of said flighting is adapted to move said bulk material along said auger conveyor means to said central area, wherein the improvement comprises a plurality of material dislodging teeth carried by said auger conveyor means and projecting outwardly from said auger conveyor means, wherein said teeth are affixed to said rear surface of said flighting, wherein each said tooth comprises a pointed end carried by the leading end of a shank inclined in the direction of travel of said tooth, wherein the trailing end of said shank is connected to support means carried by said auger conveyor means, wherein said support means is generally parallel to said centerline of said auger conveyor means and has a curved leading surface with a radius of curvature of at least about 0.1 inch.

24. A silo unloader in accordance with claim 23, wherein said unloader is adapted to unload a silo from the bottom thereof.

25. A silo unloader in accordance with claim 24, wherein said conveyor means comprises a sweep arm which is adapted to pivot about a central opening in the floor of a silo.

26. An unloading apparatus of the type adapted to unload bulk material from the bottom of a storage structure having a centrally located opening in the floor thereof, wherein said apparatus includes (a) a sweep arm comprising an elongated auger having an inner end and an outer end, said elongated auger extending radially from said central opening to a point near the wall of said structure, said sweep arm being adapted to dislodge and transport said material to said opening, said sweep arm being adapted to pivot about said central opening; conveyor means beneath said opening which is adapted to convey said material from said opening to a point beyond the wall of said storage structure; and (c) a power source adapted to power said sweep arm and said conveyor means; wherein the improvement comprises said elongated auger being hollow at said inner end and including planetary gear means disposed within the inner end of said auger said planetary gear means being adapted to transmit rotational energy generated by said power source to said elongated auger for rotating the elongated auger about its own axis.

27. Unloading apparatus in accordance with claim 26, further comprising a plurality of material dislodging teeth carried by said sweep arm and projecting outwardly therefrom, wherein each said tooth comprises a pointed end carried by the leading end of a shank inclined in the direction of travel of said tooth.

28. Unloading apparatus in accordance with claim 27, wherein said sweep arm comprises a rotatable auger, and wherein said teeth are attached to the periphery of said auger by support means having a curved leading surface.

* * * * *